(12) United States Patent
Hao et al.

(10) Patent No.: US 10,186,228 B2
(45) Date of Patent: Jan. 22, 2019

(54) DRIVING CIRCUIT FOR ARRAY SUBSTRATE, ARRAY SUBSTRATE, DISPLAY PANEL, AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Yuanyuan Hao, Beijing (CN); Zhaohui Hao, Beijing (CN); Zhixiao Yao, Beijing (CN)

(73) Assignees: BOE TECHNOLOGY GROUP CO., LTD., Beijing (CN); BEIJING BOE DISPLAY TECHNOLOGY CO., LTD, Beijing (CN)

( * ) Notice: Subject to any disclaimer, the term of this patent is extended or adjusted under 35 U.S.C. 154(b) by 168 days.

(21) Appl. No.: 15/142,015

(22) Filed: Apr. 29, 2016

(65) Prior Publication Data
US 2017/0047036 A1     Feb. 16, 2017

(30) Foreign Application Priority Data
Aug. 11, 2015   (CN) .......................... 2015 1 0490765

(51) Int. Cl.
G06F 3/038     (2013.01)
G09G 3/36      (2006.01)
G02F 1/1362    (2006.01)

(52) U.S. Cl.
CPC ..... *G09G 3/3696* (2013.01); *G02F 1/136286* (2013.01); *G09G 3/3614* (2013.01);
(Continued)

(58) Field of Classification Search
USPC ..... 345/92, 98, 204, 209, 213, 208, 206, 87, 345/94; 349/40; 438/18; 340/14.1;
(Continued)

(56) References Cited

U.S. PATENT DOCUMENTS 6,166,713 A * 12/2000 Asai .................. G02F 1/1362
                                                                345/92
6,219,113 B1 * 4/2001 Takahara ............. G02F 1/1334
                                                                345/98
(Continued)

FOREIGN PATENT DOCUMENTS

CN    102169256 A    8/2011
CN    103227173 A    7/2013
(Continued)

OTHER PUBLICATIONS

Notification of the First Office Action dated Feb. 4, 2017 corresponding to Chinese application No. 201510490765.2.

*Primary Examiner* — Thuy Pardo
(74) *Attorney, Agent, or Firm* — Nath Goldberg & Meyer; Joshua B. Goldberg

(57) ABSTRACT

The present disclosure provides a driving circuit for an array substrate, an array substrate, a display panel, and a display device. The driving circuit comprises a plurality of driving signal lines, which are insulated from each other and are used for driving a display region of the array substrate; and at least one driving circuit protection line insulated from the plurality of driving signal lines, wherein a voltage of the driving circuit protection line is smaller than that of each of the plurality of driving signal lines.

19 Claims, 1 Drawing Sheet

(52) U.S. Cl.
CPC .............. *G02F 2001/13629* (2013.01); *G09G 2300/0421* (2013.01); *G09G 2320/04* (2013.01); *G09G 2330/04* (2013.01)

(58) Field of Classification Search
USPC .......................................................... 257/59
See application file for complete search history.

(56) References Cited

U.S. PATENT DOCUMENTS

| | | | |
|---|---|---|---|
| 6,307,681 B1 * | 10/2001 | Aoki .................... | G09G 3/3648 340/14.1 |
| 6,900,853 B2 * | 5/2005 | Watanabe ......... | G02F 1/136227 257/59 |
| 2004/0061694 A1 * | 4/2004 | Noguchi .............. | G09G 3/3233 345/204 |
| 2007/0268420 A1 * | 11/2007 | Tsai .................... | G02F 1/13452 349/40 |
| 2013/0328840 A1 * | 12/2013 | Fujikawa .............. | G02F 1/1345 345/204 |
| 2015/0044789 A1 * | 2/2015 | Yamada ................ | G02F 1/1309 438/18 |
| 2015/0348507 A1 * | 12/2015 | Zhang .................. | G09G 3/3677 345/213 |

FOREIGN PATENT DOCUMENTS

| | | |
|---|---|---|
| CN | 103474418 A | 12/2013 |
| EP | 1081676 A1 | 3/2001 |
| JP | 2001154221 A | 6/2001 |

* cited by examiner

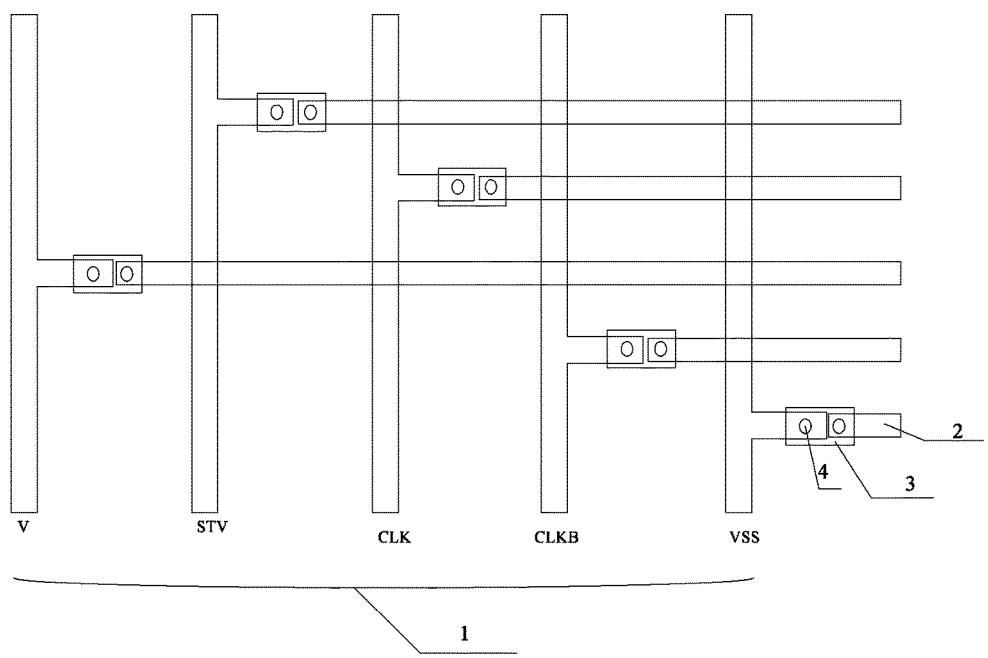

DRIVING CIRCUIT FOR ARRAY SUBSTRATE, ARRAY SUBSTRATE, DISPLAY PANEL, AND DISPLAY DEVICE

CROSS-REFERENCE TO RELATED APPLICATION

This application claims priority to Chinese Patent Application No. 201510490765.2, filed on Aug. 11, 2015, the contents of which are incorporated by reference in the entirety.

FIELD OF THE INVENTION

The present invention relates to the field of display technology, and in particular, relates to a driving circuit for an array substrate, an array substrate, a display panel, and a display device.

BACKGROUND OF THE INVENTION

At present, a driving unit of a liquid crystal display device is generally integrated on a base substrate of an array substrate. For example, a driving circuit such as a gate driving circuit is generally integrated on an outer side of a display region of an array substrate, and the gate driving circuit carries out driving thin film transistors in the display region by receiving and transmitting a voltage signal.

However, since signal lines between the driving circuit and the thin film transistors are made of indium tin oxide, etching with hydrochloric acid is usually adopted for patterning in a manufacturing process, which will result in residual chlorine ions $Cl^-$.

In addition, moisture may permeate to a display device during use, which introduces oxygen ions $O^{2-}$. Therefore, a phenomenon that trivalent indium is reduced to elemental indium happens on the signal line of the driving circuit to which a relatively low voltage is applied (a cathode) during a driving process, that is, the following electrochemical reactions (electrolytic cell effect) occur on the signal line of the driving circuit.

Cathodic reaction: $In^{3+}+3e^-=In$.
Anodic reaction: $2Cl^--2e^-=Cl_2$, or $2O^{2-}-4e^-=O_2$.

The aforesaid phenomenon increases resistance of the signal line of the driving circuit, which has an effect on the driving of the thin film transistors, thereby causing abnormal display.

SUMMARY OF THE INVENTION

An object of the present disclosure is to provide a driving circuit for an array substrate, an array substrate, a display panel and a display device, which may solve the problem of abnormal display in the prior art due to electrochemical corrosion which is likely to occur in the driving circuit.

Embodiments of the present invention provide a driving circuit for an array substrate, comprising a plurality of driving signal lines, which are insulated from each other and are used for driving a display region of the array substrate; and at least one driving circuit protection line insulated from the plurality of driving signal lines, a voltage applied to the driving circuit protection line is smaller than a voltage applied to the plurality of driving signal lines.

The driving signal line may comprise a first metal layer, a second metal layer and a third metal layer which connects the first metal layer with the second metal layer, wherein each driving signal is applied to a corresponding electrode in the display region via the third metal layer.

The driving circuit protection line may comprise a first metal layer, a second metal layer and a third metal layer which connects the first metal layer with the second metal layer.

An end of the first metal layer and an end of the second metal layer, which face each other, are provided therein with contact holes respectively, and the third metal layer is connected with the second metal layer and the first metal layer through the contact holes respectively.

A negative voltage signal may be applied to the driving circuit protection line.

A negative voltage signal whose absolute value is smaller than the absolute value of the negative voltage signal applied to the driving circuit protection line may be applied to each of the plurality of driving signal lines.

A positive voltage signal may be applied to each of the plurality of driving signal lines.

A direct current negative voltage signal may be applied to the driving circuit protection line.

The third metal layer may comprise transparent electrode material.

The first metal layer and a gate may be provided in the same layer.

The second metal layer, a source and a drain may be provided in the same layer.

The third metal layer and a pixel electrode may be provided in the same layer.

Embodiments of the present invention further provide an array substrate, comprising the aforesaid driving circuit for an array substrate.

Embodiments of the present invention further provide a display panel, comprising the aforesaid array substrate.

Embodiments of the present invention further provide a display device, comprising the aforesaid display panel.

In the driving circuit for an array substrate, the array substrate, the display panel, and the display device according to the embodiments of the present invention, at least one driving circuit protection line is added to the driving circuit, so that, even if electrolytic cell effect occurs during operation of the driving circuit, it may be ensured that electrochemical corrosion mainly happens on the driving circuit protection line while the driving signal lines which maintain normal operation in the driving circuit are not subject to the corrosion, thereby eliminating the problem of abnormal display due to corrosion of the driving signal lines.

BRIEF DESCRIPTION OF THE DRAWINGS

FIG. 1 is a schematic structural diagram of a driving circuit according to embodiments of the present invention.

DETAILED DESCRIPTION OF THE EMBODIMENTS

In order to make those skilled in the art better understand the technical solutions of the present invention, the present invention will be further described in detail below in conjunction with the accompanying drawing and specific implementations.

Embodiments of the present invention provide a driving circuit for an array substrate. As shown in FIG. 1, the driving circuit comprises a plurality of driving signal lines, which are insulated from each other and are used for driving a display region of the array substrate, and the driving circuit further comprises at least one driving circuit protection line insulated from the plurality of driving signal lines, a voltage applied to the driving circuit protection line is smaller than that applied to each of the plurality of driving signal lines.

In the driving circuit in the embodiments of the present invention, at least one driving circuit protection line is added, so that, even if electrolytic cell effect occurs during operation of the driving circuit, it may be ensured that electrochemical corrosion mainly happens on the driving circuit protection line while the driving signal lines which maintain normal operation in the driving circuit are not subject to corrosion, thereby eliminating the risk of abnormal display due to corrosion of the driving signal lines.

Specifically, as shown in FIG. 1, the driving circuit comprises four sequentially provided driving signal lines STV, CLK, CLKB and VSS. An input signal of the driving circuit is applied to the driving signal line STV and is used for charging a capacitor of the driving circuit, so that the capacitor discharge may provide a turn-on voltage for output of the driving circuit. An output signal of the driving circuit is applied to the driving signal line CLK, and an output voltage of the driving circuit is a high level voltage of CLK. A signal for maintaining an off state of the driving circuit is applied to the driving signal line CLKB, and specifically, a turn-off voltage of the driving circuit may deviate when the driving circuit is in the off state, but the turn-off voltage of the driving circuit will be restored to the original state to avoid deviation when the signal on CLKB is at a high level. A direct current low voltage for closing the output of the driving circuit is applied to the driving signal line VSS.

It should be understood that the driving signal lines of the driving circuit may be signal lines of other types according to different driving methods, and are not limited herein.

Positional relationships between the driving circuit protection line and the respective driving signal lines in a plane or a three-dimensional space is not limited, as long as the driving circuit protection line is insulated from all the driving signal lines.

As shown in FIG. 1, the driving circuit further comprises a driving circuit protection line V having the same structure as the aforesaid four driving signal lines. When the driving circuit operates, a voltage applied to the driving circuit protection line V is smaller than that applied to each of the aforesaid four driving signal lines. When electrochemical corrosion occurs, the driving circuit protection line V may serve as a cathode of an electrolytic cell to be corroded, while the driving signal lines of the driving circuit serve as an anode and thus are not corroded, thereby eliminating the risk of abnormal display due to corrosion of the driving signal lines.

In some embodiments, each driving signal line comprises a first metal layer 1, a second metal layer 2 and a third metal layer 3 which connects the first metal layer 1 with the second metal layer 2. The third metal layer 3 is used for transferring a driving signal to a corresponding electrode in the display region.

In addition, the driving circuit protection line V comprises a first metal layer 1, a second metal layer 2 and a third metal layer 3 which connects the first metal layer 1 with the second metal layer 2.

In some embodiments, an end of the first metal layer 1 and an end of the second metal layer 2, which face each other, are provided therein with contact holes 4, respectively, and the third metal layer 3 is connected with the second metal layer 2 and the first metal layer 1 through the contact holes 4, respectively.

As shown in FIG. 1, patterns of the first metal layers 1 of each driving signal line and the driving circuit protection line V are formed by a patterning process. That is to say, the first metal layers 1 of each driving signal line and the driving circuit protection line V are formed by a single patterning process.

In some embodiments, the first metal layer 1 and a gate may be provided in the same layer, which may simplify process and reduce manufacturing cost in a manufacturing process. The specific manufacturing method relates to the scope of the prior art, and thus will not be described herein.

In some embodiments, the second metal layer 2, a source and a drain may be provided in the same layer, which may simplify process and reduce manufacturing cost in a manufacturing process. The specific manufacturing method relates to the scope of the prior art, and thus will not be described herein.

That is to say, the first metal layers 1 of the aforesaid driving signal lines STV, CLK, CLKB and VSS and the driving circuit protection line V are formed in the same patterning process as the gate, and the second metal layers 2 of the aforesaid driving signal lines STV, CLK, CLKB and VSS and the driving circuit protection line V are formed in the same patterning process as the source and the drain.

Specifically, the third metal layer 3 may comprise a transparent electrode material, such as indium tin oxide, which may reduce types of metal and simplify process in a manufacturing process.

The third metal layer 3 may be patterned by a patterning process. In some embodiments, the third metal layer 3 and a pixel electrode may be formed at the same time, that is, the third metal layer 3 and the pixel electrode may be provided in the same layer, which may simplify manufacturing process. The specific manufacturing method relates to the scope of the prior art, and thus will not be described herein.

A part of the third metal layer 3 of each of the aforesaid driving signal lines may extend to the display region of the array substrate, so as to be connected with an electrode of a thin film transistor. The third metal layer 3 of the driving circuit protection line V may not be connected with an electrode of the thin film transistor.

In some embodiments, a negative voltage signal is applied to the driving circuit protection line V. When a positive voltage signal or a negative voltage signal having a smaller absolute value is applied to the driving signal line, the negative voltage signal applied to the driving circuit protection line V causes the driving circuit protection line V to serve as the cathode of the electrolytic cell to be corroded during the entire driving operation, while the driving signal lines serve as the anode and thus are not corroded.

In some embodiments, a direct current negative voltage signal is applied to the driving circuit protection line V, and the direct current negative voltage signal is easy to control, that is, there is no need to adjust the voltage signal on the driving circuit protection line V during the entire driving period.

Embodiments of the present invention further provide an array substrate, comprising the aforesaid driving circuit for an array substrate.

Embodiments of the present invention further provide a display panel, comprising the aforesaid array substrate.

Embodiments of the present invention further provide a display device, comprising the aforesaid display panel.

The display device may be any product or component having a display function, such as a mobile phone, a tablet computer, a TV set, a monitor, a notebook computer, a digital photo frame, a navigator, or the like.

It should be understood that the foregoing implementations are merely exemplary implementations adopted for describing the principle of the present invention, but the present invention is not limited thereto. Those of ordinary skill in the art may make various variations and improvements without departing from the spirit and essence of the present invention, and these variations and improvements shall be considered to fall within the protection scope of the present invention.

What is claimed is:

1. A driving circuit for an array substrate, comprising:
a plurality of driving signal lines, which are insulated from each other and are used for driving a display region of the array substrate; and
at least one driving circuit protection line insulated from the plurality of driving signal lines,
wherein a voltage applied to the driving circuit protection line is smaller than a voltage applied to the plurality of driving signal lines;
the driving signal line comprises a first metal layer, a second metal layer and a third metal layer which connects the first metal layer with the second metal layer, and
each driving signal is applied to a corresponding electrode in the display region via the third metal layer.

2. The driving circuit of claim 1, wherein an end of the first metal layer and an end of the second metal layer, which face each other, are provided therein with contact holes respectively, and the third metal layer is connected with the second metal layer and the first metal layer through the contact holes respectively.

3. The driving circuit of claim 1, wherein a negative voltage signal is applied to the driving circuit protection line.

4. The driving circuit of claim 3, wherein a negative voltage signal whose absolute value is smaller than the absolute value of the negative voltage signal applied to the driving circuit protection line is applied to each of the plurality of driving signal lines.

5. The driving circuit of claim 3, wherein a positive voltage signal is applied to each of the plurality of driving signal lines.

6. The driving circuit of claim 3, wherein a direct current negative voltage signal is applied to the driving circuit protection line.

7. The driving circuit of claim 1, wherein the third metal layer comprises transparent electrode material.

8. The driving circuit of claim 1, wherein the first metal layer and a gate are provided in the same layer.

9. The driving circuit of claim 1, wherein the second metal layer, a source and a drain are provided in the same layer.

10. The driving circuit of claim 1, wherein the third metal layer and a pixel electrode are provided in the same layer.

11. An array substrate, comprising the driving circuit of claim 1.

12. A display panel, comprising the array substrate of claim 11.

13. A display device, comprising the display panel of claim 12.

14. A driving circuit for an array substrate, comprising:
a plurality of driving signal lines, which are insulated from each other and are used for driving a display region of the array substrate, and
at least one driving circuit protection line insulated from the plurality of driving signal lines,
wherein a voltage applied to the driving circuit protection line is smaller than a voltage applied to the plurality of driving signal lines,
wherein the driving circuit protection line comprises a first metal layer, a second metal layer and a third metal layer which connects the first metal layer with the second metal layer.

15. The driving circuit of claim 14, wherein an end of the first metal layer and an end of the second metal layer, which face each other, are provided therein with contact holes respectively, and the third metal layer is connected with the second metal layer and the first metal layer through the contact holes respectively.

16. The driving circuit of claim 14, wherein the third metal layer comprises transparent electrode material.

17. The driving circuit of claim 14, wherein the first metal layer and a gate are provided in the same layer.

18. The driving circuit of claim 14, wherein the second metal layer, a source and a drain are provided in the same layer.

19. The driving circuit of claim 14, wherein the third metal layer and a pixel electrode are provided in the same layer.

* * * * *